UNITED STATES PATENT OFFICE.

MAX MOSZKOWSKI, OF GRUNEWALD, NEAR BERLIN, AND ALWIN LOEWENTHAL, OF CHARLOTTENBURG, GERMANY.

COVERING FOR BALLOONS AND THE LIKE.

1,180,732.  Specification of Letters Patent.  Patented Apr. 25, 1916.

No Drawing.  Application filed September 29, 1913.  Serial No. 792,420.

*To all whom it may concern:*

Be it known that we, MAX MOSZKOWSKI and ALWIN LOEWENTHAL, subjects of Germany, residing at Grunewald, near Berlin, and Charlottenburg, near Berlin, Germany, respectively, have invented new and useful Improvements in or Relating to Coverings for Balloons and the like, of which the following is a specification.

This invention has for its object to provide means for rendering harmless the electrical charges which are formed on airships, balloons and the like, in consequence of the electricity in the air or of the friction of the gas in passing out of the balloon.

According to this invention the cover of the balloon or the like is provided with a coating of electrically conducting substance. By this means the balloon or airship, is either rendered incapable of receiving or accumulating an electrical charge or at least it is caused to acquire the potential of its surroundings in a minimum period of time.

Radium has the property of ionizing the surrounding air in proportion to its quantity. An exactly determined quantity of radium is, however, always only able to conduct an exactly determined quantity of electricity in a unit of time, this quantity being exactly proportionate to the number of ions which is produced by the quantity of radium in the unit of time.

As regards the purposes of this invention, enormous quantities of electricity have to be dealt with, and further the capacities of the various parts of the balloon differ very much according to the shape of the air-ship. Now if any point of the airship should become charged with electricity by induction or other means, then an immediate establishment of a state of equilibrium, that is to say, an instantaneous discharge, can only take place without danger, if there are sufficient quantities of radium at this point. If, however, every point of the airship had to deal with the high potentials that come into question, the cost of such protection would be many times greater than the value of the structure which is to be protected.

Now according to this invention the entire covering of the balloon is made electrically conducting, by means of a metallic coating, so that the potential will be equal at all points of the same. The amount of electricity which is thereby distributed uniformly over the entire ship will be discharged by the radio-activity of the small quantity of radium provided at a suitable point of the balloon covering. The result of this improved arrangement is that it is not only the small quantity of radium at the discharging place that coöperates in discharging the electricity while the rest of the radium provided on the balloon is inoperative, but the entire quantity of radium used on the balloon effects the purpose in view in the same manner as if the entire airship were surrounded with innumerable lightning conductors.

The rendering of the balloon radio-active can be accomplished in various ways. Thus the radium can be applied to the metal coating of the cover either to the outer surface or the inner surface of the cover, and either at one place or at several places thereof in form of a solution, say a rubber solution, or in any other suitable manner. In case of applying the radium to the inner surface of the cover, the radium serves the purpose to render the electricity contained in the balloon, or developed therein during the flight, innocuous.

Owing to the electrically conducting metal the entire quantity of radium is active, According to experiments made one milligram of radium would suffice for a balloon surface of one thousand square meters.

What we claim is:

1. A covering for balloons, airships, etc., which is provided with an electrically conducting coating and is treated with a radio-active substance.

2. A covering for balloons, airships, etc., which is provided with a metal coating and is treated with a radio-active substance.

In testimony whereof we have signed our names to this specification in the presence of two subscribing witnesses.

DR. MAX MOSZKOWSKI.
ALWIN LOEWENTHAL.

Witnesses:
  WOLDEMAR HAUPT,
  HENRY HASPER.